US011647477B1

(12) United States Patent
Zhang

(10) Patent No.: US 11,647,477 B1
(45) Date of Patent: May 9, 2023

(54) POSITIONING METHOD AND RELATED DEVICES

(71) Applicant: BlueWave Technology (Shanghai) Co., Ltd, Shanghai (CN)

(72) Inventor: Zhenrui Zhang, Shanghai (CN)

(73) Assignee: BlueWave Technology (Shanghai) Co., Ltd, Shanghai (CN)

(*) Notice: Subject to any disclaimer, the term of this patent is extended or adjusted under 35 U.S.C. 154(b) by 0 days.

(21) Appl. No.: 17/851,315

(22) Filed: Jun. 28, 2022

Related U.S. Application Data

(63) Continuation of application No. PCT/CN2022/097146, filed on Jun. 6, 2022.

(30) Foreign Application Priority Data

Dec. 29, 2021 (CN) .......................... 202111625572.5

(51) Int. Cl.
H04W 64/00 (2009.01)
H04W 48/10 (2009.01)
H04W 74/08 (2009.01)
H04L 5/00 (2006.01)

(52) U.S. Cl.
CPC .......... H04W 64/00 (2013.01); H04L 5/0048 (2013.01); H04W 48/10 (2013.01); H04W 74/0833 (2013.01)

(58) Field of Classification Search
CPC . H04W 64/00; H04W 74/0833; H04W 48/10; H04L 5/0048
See application file for complete search history.

(56) References Cited

U.S. PATENT DOCUMENTS

| 8,787,227 B2 * | 7/2014 | Henttonen ........ H04W 52/0216 370/310.2 |
| 2016/0374109 A1 * | 12/2016 | Rico Alvarino ....... H04B 1/713 |
| 2018/0049022 A1 * | 2/2018 | Johansson ............. H04W 24/02 |
| 2018/0317263 A1 * | 11/2018 | Ishii .................. H04W 74/0833 |
| 2019/0074946 A1 | 3/2019 | Xue et al. |

FOREIGN PATENT DOCUMENTS

| CN | 111131997 A | 5/2020 |
| CN | 111343567 A | 6/2020 |
| CN | 111867034 A | 10/2020 |

(Continued)

OTHER PUBLICATIONS

First Office Action issued in counterpart Chinese Patent Application No. 202111625572.5, dated Feb. 9, 2022.

Primary Examiner — Muthuswamy G Manoharan
(74) Attorney, Agent, or Firm — Westbridge IP LLC

(57) ABSTRACT

Disclosed are a positioning method and related devices. The method includes: accessing a base station through a random-access process; and obtaining resources of a sounding reference signal distributed by the base station, and sending, according to a predetermined first period, the sounding reference signal to the base station using the resources of the sounding reference signal, to enable the base station to determine the arrival time of the sounding reference signal and determine the position of a terminal device according to the arrival time. According to the solutions provided by the present disclosure, a terminal device can be precisely positioned, and at the same time, the cost can be effectively reduced.

16 Claims, 3 Drawing Sheets

(56) References Cited

FOREIGN PATENT DOCUMENTS

| CN | 112584484 | A |   | 3/2021 |
|----|-----------|---|---|--------|
| CN | 112769533 | A |   | 5/2021 |
| CN | 113273267 | A |   | 8/2021 |
| CN | 113302996 | A |   | 8/2021 |
| CN | 113747344 | A |   | 12/2021 |
| CN | 115190501 | A | * | 10/2022 |
| WO | WO-2022005055 | A1 | * | 1/2022 |
| WO | WO-2022011682 | A1 | * | 1/2022 |

* cited by examiner

POSITIONING METHOD AND RELATED DEVICES

CROSS-REFERENCE TO RELATED APPLICATIONS

The present application is a continuation of International Application PCT/CN2022/097146, entitled "Positioning Method and Related Devices", filed on Jun. 6, 2022, which claims priority to Chinese Patent Application CN202111625572.5, filed on Dec. 29, 2021, the entire contents of which are incorporated herein by reference.

TECHNICAL FIELD

The present disclosure relates to communication technologies, and in particular to a positioning method and related devices.

BACKGROUND

With rapid developments of communication technologies, positioning functions of a terminal device becomes more and more indispensable to our daily life. In some application scenarios, a user may need to know a position of a specific terminal device.

However, in actual applications, a cost of obtaining position information of a terminal device may be high, while the precision of positioning may be poor.

SUMMARY

In view of the above, the present disclosure provides a positioning method. By the positioning method, a terminal device can be positioned precisely, and at the same time, a cost of performing the method can be reduced effectively.

The positioning method carried out by a terminal device according to examples of the present disclosure may include: accessing a base station through a random-access process; obtaining resources of a sounding reference signal distributed by the base station; and sending the sounding reference signal to the base station according to a predetermined first period using the resources of the sounding reference signal, to enable the base station to determine an arrival time of the sounding reference signal and to determine a position of the terminal device according to the arrival time.

On the basis of the same inventive concept, the present disclosure further provides a positioning method carried out by a base station. The positioning method may include: accessing a terminal device accessed through a random-access process; distributing resources of a sounding reference signal to the terminal device; receiving the sounding reference signal which is sent according to a predetermined first period by the terminal device; determining an arrival time of the sounding reference signal; and sending the arrival time to a data center to enable the data center to determine a position of the terminal device according to the arrival time.

On the basis of the same inventive concept, the present disclosure further provides a positioning device, including: an access module, configured to access a base station through a random-access process; and a processing module, configured to obtain resources of a sounding reference signal distributed by the base station, and send the sounding reference signal according to a predetermined first period to the base station using the resources of the sounding reference signal, to enable the base station to determine an arrival time of the sounding reference signal and to determine a position of the terminal device according to the arrival time.

On the basis of the same inventive concept, the present disclosure further provides a positioning device, including: an access module, configured to access a terminal device accessed through a random-access process; a first processing module, configured to distribute resources of a sounding reference signal to the terminal device and receive the sounding reference signal which is sent according to a predetermined first period by the terminal device; and a second processing module, configured to determine an arrival time of the sounding reference signal, and send the arrival time to a data center to enable the data center to determine a position of the terminal device according to the arrival time.

On the basis of the same inventive concept, the present disclosure also provides an electronic device, comprising a memory, a processor, and a computer program stored in the memory and executable on the processor, wherein the processor executes the computer program to implement the positioning method.

The present disclosure also provides a non-transitory computer-readable storage medium, wherein the non-transitory computer-readable storage medium stores computer instructions, and the computer instructions being used to make a computer execute the positioning method.

According to the above descriptions, the positioning method and related devices provided by the present disclosure are implemented through a positioning system composed of three types of entities including at least one terminal device, a base station and a data center. Wherein, the terminal device may only have basic communication functions of a mobile communication system. Therefore, operation and maintenance costs can be extremely low and so is the power consumption. The base station receives the sounding reference signal sent by the terminal device through a wireless transceiving function and gathers signals to data center. The data center determines the position of the terminal device through a network connection with the base station, provides related data of other terminal devices, manages and controls the terminal devices. According to the solutions provided by the present disclosure, a mobile device can be positioned precisely, and at the same time, the cost can be reduced effectively.

BRIEF DESCRIPTION OF THE DRAWINGS

In order to describe the technical solutions in the present disclosure or the related art more clearly, the following briefly introduces the accompanying drawings required for describing the examples or the related art. Apparently, the accompanying drawings in the following descriptions are only some examples of the present disclosure, and those of ordinary skill in the art may still derive other drawings from these drawings without creative efforts.

DETAILED DESCRIPTION OF THE EMBODIMENTS

Figure 1:
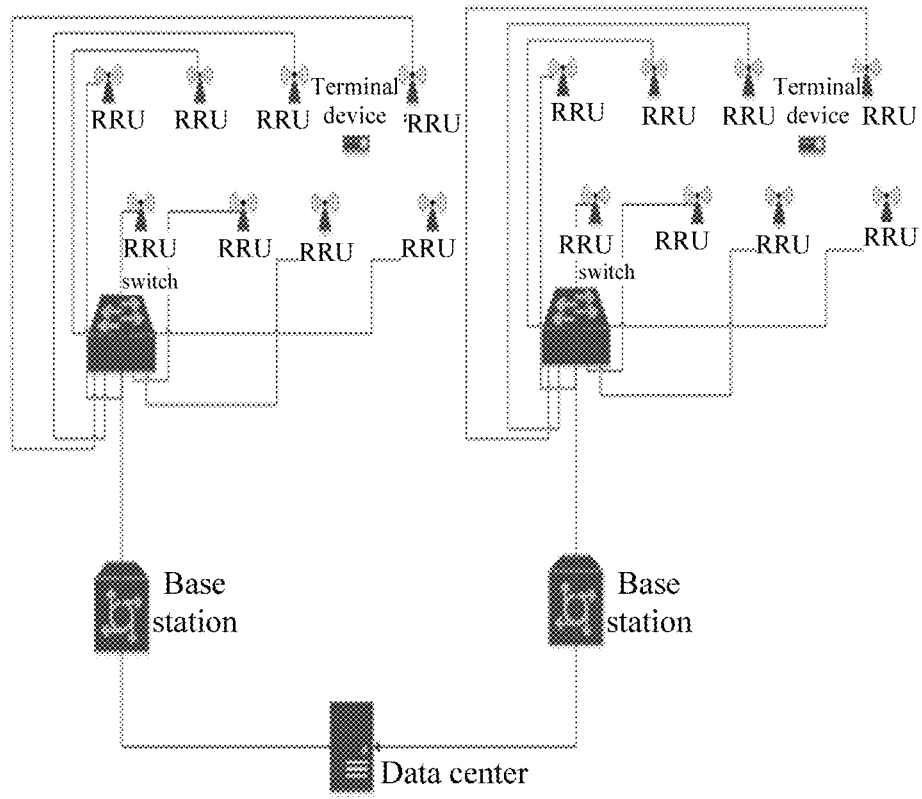
FIG. 1 is a schematic diagram illustrating a structure of a positioning system applying a positioning method according to an example of the present disclosure.

To make the objectives, technical solutions and advantages of the present disclosure clearer, the present disclosure will be further described in detail below in conjunction with specific examples and with reference to the accompanying drawings.

It should be noted that, unless otherwise defined, technical terms or scientific terms used in the examples of the present disclosure should have the ordinary meanings as understood by those of ordinary skill in the art to which the present disclosure belongs. The terms "first", "second" and similar words used in the examples of the present disclosure do not denote any order, quantity, or importance, but are merely used to distinguish different components. The terms "including" or "comprising" and the like are intended to indicate that elements or objects in front of the word encompass elements or objects listed after the word and their equivalents, but do not exclude another element or object. Similar terms such as "connected" or "linked" are not limited to physical or mechanical connections, but may include electrical connections, whether direct or indirect. The terms "upper", "lower", "left", "right" and the like are only used to represent a relative positional relationship, and when an absolute position of a described object changes, the relative positional relationship may also change accordingly.

As described in the background, in actual applications, the cost of obtaining position information of a terminal device may be quite high, however a positioning precision may be quite poor. As you may know, common positioning solutions may include positioning functions of a traditional global positioning system or positioning functions of a mobile communication system. In a traditional global positioning system, a terminal device may receive a plurality of satellite signals, calculate earth-based coordinates, and then maps the earth-based coordinates to a map to determine the position of the terminal device. In a mobile communication system, positioning is one of the functions provided by the entire mobile communication system. Specifically, positioning can be achieved through a complete transceiving capacity of the mobile terminal. Moreover, position information can be sent out through a communication capacity of the mobile communication system.

During an implementation process of the present disclosure, the applicant finds that the specific reasons for the problems existing in the related technologies are as follows: in the traditional global positioning system, in a place where satellite signals are shielded or blocked, such as in the interior of a building, an underground parking garage or an urban high-rise dense area, positioning is difficult to achieve.

Further, the positioning precision is also limited by the numbers of satellites. In the mobile communication system, the mobile terminal, after obtaining its own position information, still needs a mobile communication network to send the position information out. That is, for a user needing to obtain the position information of a specific mobile terminal, a mobile communication module needs to be mounted into the terminal. However, the positioning function is only one of the multiple functions of the mobile terminal, and the implementation of the positioning function relies on other functions of mobile communications. That is, the positioning function cannot work independently. Therefore, the user needing to obtain only the position information of a terminal device needs to pay the cost of the entire mobile communication terminal. In addition, communications with the user through the mobile terminal are usually needed to obtain the position information. In order to achieve communications, the user of the mobile terminal also needs to pay the cost of data communications.

For solving the above problems, the present disclosure provides a positioning solution. In the solution of the present disclosure, as shown in FIG. 1, the positioning system applying the positioning method of examples of the present disclosure may include three types of entities including: at least one terminal device, a base station and a data center.

In some examples of the present disclosure, the terminal device may only have a part of functions similar to those of a mobile terminal device, such as network searching, random-access, and sending a sounding reference signal (SRS). The design of the above terminal device may greatly reduce the cost of the positioning function. Specifically, due to having only basic communication functions of the mobile communication system, the positioning system of the present disclosure may support a large quantity of terminal devices and the terminal devices may be uniquely identified. Moreover, the cost of design, manufacture, operation and maintenance, as well as the power consumption of the terminal devices can be extremely reduced. As the power consumption of the terminal devices can be extremely low, a power module for supplying energy in the terminal device according to examples of the present disclosure may maintain a longer working time, which can be a few days, a few months and even a few years.

In some examples of the present disclosure, the base station may be reconstructed on the basis of a base station in an existing long-term evolution (LTE) system or a 5G new radio (NR) system. Alternatively, the base station may also be a device, with functions similar to those of LTE/NR base stations, constructed independently. The base station according to examples of the present disclosure is arranged with the wireless transceiving function, and the positioning function may be achieved through corresponding configuration and algorithm software upgrade according to the needs of the positioning system. Therefore, the base station according to examples of the present disclosure may be regarded as a virtual device based on a hardware device of the existing wireless communication system, and a base station hardware device does not need to be additionally laid for the positioning function. Specifically, the base station according to examples of the present disclosure may be connected to a plurality of remote radio units (RRU) through a switch to expand the coverage area of the base station, and the base station can achieve better coverage especially in an indoor positioning scenario.

In examples of the present disclosure, the data center can be a cloud processing center of the entire positioning system and is responsible for maintaining status information of the terminal devices through network connections with the base station, wherein, the state information may include positioning demand (positioning precision, position tracking frequency, etc.), operating status (speed, direction, etc.), current position, period of an uplink positioning signal (that is, SRS in examples of the present disclosure), etc. The position information of the terminal device can be obtained through the data center. A user may conveniently master the position of a terminal device through a cloud map data.

In the following embodiments, an NR mobile communication system is taken as hardware infrastructure to further specify the positioning method according to examples of the present disclosure. For other wireless communication systems, such as an LTE or a 6G system, the positioning method may work through adopting the mode similar to the mode based on the NR system.

Figure 2:
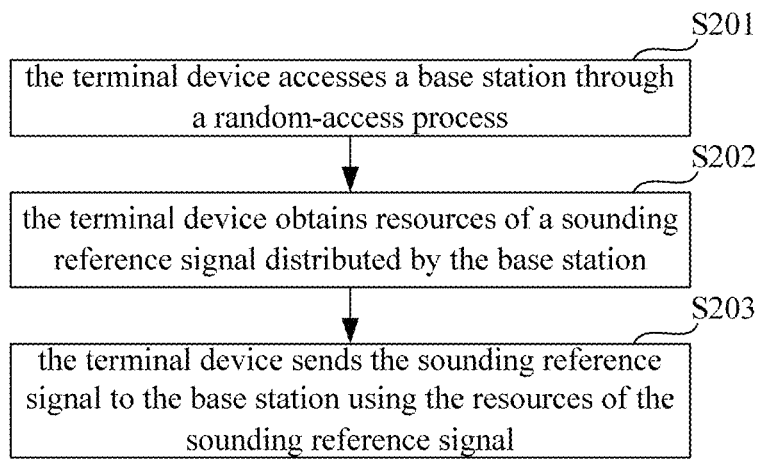
FIG. 2 is a flow chart of a positioning method applied to a terminal device according to an example of the present disclosure.

Examples of the present disclosure provide a positioning method applied to a terminal device. Refer to FIG. 2 which is a flow chart of the positioning method applied to the terminal device according to examples of the present disclosure. The positioning method may include the following steps.

In step S201, the terminal device accesses a base station through a random-access process.

In some examples, the terminal device can be obtained by greatly simplifying a mobile terminal in the mobile communication system. In the terminal device, only necessary functions related to positioning are maintained, so that the cost and power consumption of the terminal device may be greatly reduced. It should be noted that after carrying out software upgrading on a common mobile terminal device in some application scenarios, the common mobile terminal device may also be used as the terminal device of the present disclosure.

In some examples, the terminal device is provided with a unique terminal identifier (UE ID). To support a large quantity of terminal devices, the length of UE ID may adopt 128 bits. At the early stage of deployment of the positioning system or when the demand for the quantity of the terminal devices is low, the length of UE ID may adopt 32 bits.

Specifically, when a random-access is carried out, the terminal device may send a random-access request including its UE ID to the base station. The base station may distribute resources of a sounding reference signal to the terminal device according to the random-access request. The resources of the sounding reference signal distributed to the terminal device are bound with the UE ID of the terminal device and are used within the coverage of the current base station only. It should be noted that within the coverage of a same base station, the quantity of the terminal devices running simultaneously cannot exceed the quantity of resources of the sounding reference signal distributed by the base station. To be noted, the quantity of resources may be flexibly configured according to implementation requirements, the quantity of terminal devices supported within the coverage of a base station, requirements on positioning and other parameters.

In step S202, the terminal device obtains resources of a sounding reference signal distributed by the base station.

In step S203, according to a predetermined first period, the terminal device sends the sounding reference signal to the base station using the resources of the sounding reference signal to enable the base station to determine an arrival time of the sounding reference signal and to determine a position of the terminal device according to the arrival time.

In the examples, after obtaining the resources of the sounding reference signal distributed by the base station, the terminal device may use the resources to send a sounding reference signal according to a certain period. In this way, the base station may carry out a following processing to determine a position of the terminal device. In order to be distinguished from the following similar statement, the period for sending the sounding reference signal is called as a first period. The first period may be adjusted in real time according to real-time requirements on positioning, the requirements on standby time (the time interval between two sounding reference signals) of the terminal device, etc.

In some examples of the present disclosure, the terminal device further needs to periodically (adjusted according to the real-time requirements on positioning, the requirements on the standby time of the terminal device, etc.) carry out a synchronization process according to a synchronization signal block (SSB) sent by the base station to determine whether it has entered the coverage of another base station. In these examples, the period of the base station sending SSB is called as a second period. Specifically, before sending the sounding reference signal, the terminal device may further receive an SSB sent by the base station according to the predetermined second period. According to specific settings, the first period may be set to be matched with the second period, so that the first period and the second period form a proportional relation of 1:1. That is, after receiving the SSB, the terminal device may send the sounding reference signal. In this way, SRS sending and SSB receiving may be carried out at a same time period so as to reduce the power consumption of the terminal device. In addition, the above setting may further ensure that the terminal device sends the sounding reference signal after conforming the SSB of the current base station can be received, so as to prevent an interference to the SRS sending of other terminal devices.

In a specific implementation, before sending the sounding reference signal, the terminal device may first receive an SSB sent by the base station. By analyzing the SSB, the terminal device may obtain a base station identifier (a base station ID) and a system frame number (SFN) included in SSB. After accessing the base station in a random-access process, the terminal device may obtain the resources of the sounding reference signal bound to the UE ID which are distributed by the base station. Later, the terminal device may use the resources to send a sounding reference signal according to the first period. In addition, the terminal device may further store the base station ID, the SFN, an index of the resources of the sounding reference signal, and the UE ID locally.

In some examples of the present disclosure, the positioning method may further include the step of re-accessing the base station of the terminal device. The step of re-accessing may be performed when the terminal device enters the coverage area of a new base station while moving. Correspondingly, the step of re-accessing may specifically include: in response to determining that a base station ID in an SSB received is different from the base station ID stored, the terminal device accesses through a random-access process to a target base station corresponding to the base station ID in the SSB received; or the terminal device receives a system information broadcast sent by the target base station, and obtain, according to the system information broadcast, the base station ID of the target base station and references of the sounding reference signal distributed by the target base station.

In some examples, as the SSB sent by the base station includes the base station ID of the base station, when the terminal device analyzes the received SSB and determines that the base station ID is different from the base station ID stored locally, the terminal device may aware that it has moved and entered a coverage area of a new base station and needs to be re-access the new base station. In this case, the terminal device may carry out a random-access procedure once again to access the new base station.

Optionally, the terminal device may access the new base station according to information broadcast by the data center. In these examples, as a cloud processing center, the data center may monitor, on the basis of the position information of the terminal devices, a moving track of each terminal device in real time. At the same time, the data center may further store positions of all base stations and RRUs of the base stations. Further, the data center may identify, according to the moving track of each terminal device and positions of the base stations and RRUs of the base stations, an event that a terminal device enters a coverage area of a new base station. In these examples, the new base station is named as the target base station. After the data center identifies the event that the terminal device enters the coverage area of the target base station, the target base station may be informed of the UE ID of the terminal device. Further, the target base station may be controlled to distribute resources of a sounding reference signal for the terminal device in advance and bind the newly distributed resources of the sounding reference signal to the UE ID (in some examples, the UE ID of the terminal device may be a temporary terminal identifier generated by the base station). Then, system information broadcast may be sent to the terminal device. At last, through the system information broadcast, the terminal device may be informed of the resources of the sounding reference signal newly distributed by the target base station for the terminal device. Specifically, the system information broadcast is composed of a main information block (MIB) and a plurality of system information blocks (SIB), where the data structure of MIB is provided with a spare bit. In this example, the terminal device may be informed, through setting the spare bit to a predetermined value (for example, the predetermined value may be set to 1), to receive the system information broadcast. In addition, the index of the newly distributed resources of the sounding reference signal bound to the UE ID of the terminal device may be recorded in SIB8 in the system information block. SIB8 is a broadcast information of a terminal alarm service by a provider in the LTE/NR system, the content and format of SIB8 may be customized, and the total bits of the content do not exceed 2976 bits. As an example, SIB8 for informing the terminal device in this example may adopt the following format:

a temporary terminal identifier of a newly entering terminal device 1, an index of new resources of a sounding reference signal;

a temporary terminal identifier of a newly entering terminal device 2, an index of new resources of a sounding reference signal;

. . .

a temporary terminal identifier of a newly entering terminal device n, an index of new resources of a sounding reference signal.

Specifically, the bit number of each content may be determined according to a total number of resources and whether the temporary terminal identifier may be compressed or not.

Based on the above setting, after receiving the system information broadcast sent by the target base station, the terminal device may determine that the spare bit of MIB is the predetermined value and further obtain, from SIB8 of the system information block, the index of the newly distributed resources of the sounding reference signal bound in advance to the UE ID, so that the terminal device can access the target base station.

Figure 3:
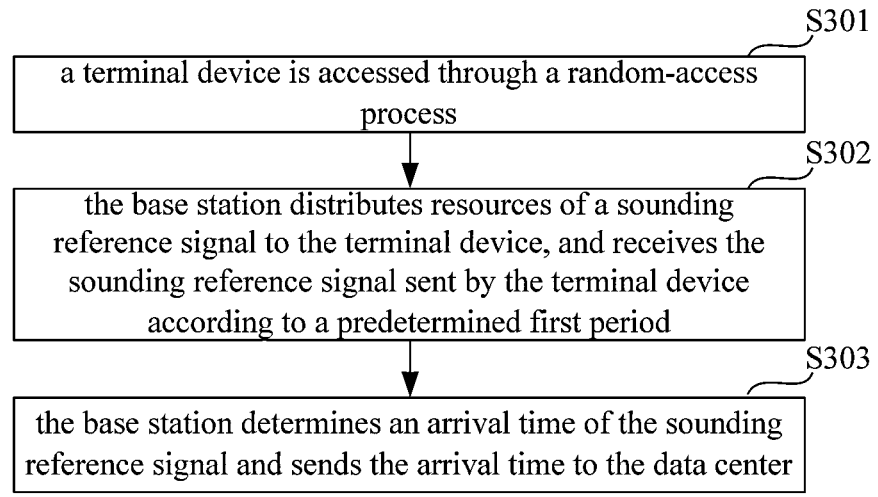
FIG. 3 is a flow chart of a positioning method applied to a base station according to an example of the present disclosure.

On the basis of the same inventive concept, examples of the present disclosure further provide a positioning method applied to the base station. Refer to FIG. 3 which is a flow chart of the positioning method applied to the base station according to examples of the present disclosure, the positioning method may include:

In step S301, a terminal device is accessed through a random-access process.

In some examples, the base station may be built on the basis of an existing mobile communication system, so that the positioning system corresponding to the positioning method of the present disclosure saves the costs of hardware laying. Moreover, the bandwidth resources of the current mobile communication system, for example the NR system can be fully utilized. In this case, the process of the terminal device accessing to the base station through the random-access process is similar to the random-access flow of the existing mobile communication system.

In specific implementations, the base station may introduce a setting of temporary terminal identifiers to expand the quantity of UE ID of the terminal device that can be processed by the base station sufficiently. Therefore, enabling the terminal device to access the base station through the random-access process may specifically include: the base station receives a random-access request sent by the terminal device and obtains a unique terminal identifier, included in the random-access request, of the terminal device; the base station generates a temporary terminal identifier corresponding to the unique terminal identifier; the base station determines resources of a sounding reference signal distributed to the terminal device and binds the resources to the temporary terminal identifier.

In this example, after obtaining the UE ID of the terminal device from a sounding reference signal sent by the terminal device, the base station may generate a temporary terminal identifier for the terminal device. To be noted, the temporary terminal identifier may be in a one-to-one correspondence relationship with the UE ID and the temporary terminal identifier may be bound to the resources of the sounding reference signal distributed to the terminal device. As described in the above examples, the base station may support access of a plenty of terminal devices. When the quantity of the terminal devices is large, the base station bears a certain burden when processing data of the UE ID. For this purpose, a temporary terminal identifier is generated for the UE ID. The temporary terminal identifier is unique and corresponding to the UE ID. Further, the temporary terminal identifier is from a dedicated recognition sequence set by the base station corresponding to the coverage area of the base station. Since the data volume of the temporary terminal identifier is lower than that of the UE ID, by binding the temporary terminal identifier to the resources of the sounding reference signal distributed to the terminal device, the data processing amount can be effectively reduced, which is equivalent to expanding the quantity of the UE ID that can be processed by the base station.

In some examples, during the random-access process, the base station is further set with a checking step. When carrying out the checking step, the base station generates a check sequence according to a predetermined algorithm and sends the check sequence to the terminal device. Specifically, the base station may generate the check sequence according to the temporary terminal identifier, a specific access time and other specific information of the terminal device, where the specific access time refers to the time point at which the terminal device starts the random-access and may specifically include the SFN, a timeslot number, a symbol number, etc. Other specific information may include the index of the random-access sequence, the base station ID, etc. After receiving the check sequence sent by the base station, the terminal device generates a local check sequence according to the predetermined algorithm (the same algorithm as the base station), and finishes the random-access process in response to determining that the check sequence is consistent with the local check sequence.

In step S302, the base station distributes resources of a sounding reference signal to the terminal device, and receives the sounding reference signal sent by the terminal device according to a predetermined first period.

In step S303, the base station determines an arrival time of the sounding reference signal and sends the arrival time to the data center to enable the data center to determine the position of the terminal device according to the arrival time.

In this example, after the terminal device is accessed, the base station may distribute resources of the sounding reference signal to the terminal device and receive the sounding reference signal sent by the terminal device according to the first period.

In addition, as described before, the base station is further connected to a plurality of RRUs and receives, through the RRUs respectively, sounding reference signals sent by the terminal device. At the same time, the base station also sends SSB through the RRUs according to the predetermined second period to enable the terminal device to receive SSB for synchronization.

In this example, the base station may receive, through the plurality of RRUs connected to the base station, sounding reference signals sent by the terminal device. Each RRU may calculate the arrival time of the sounding reference signal sent by a terminal device and sends the arrival time to the data center to enable the data center to determine the position of the terminal device. To achieve an accurate positioning, the base station may receive, through at least three RRUs, the arrival time of a same sounding reference signal sent by the terminal device, determine the arrival time respectively, and sends the arrival time determined respectively by the three RRUs to the data center.

Figure 4:
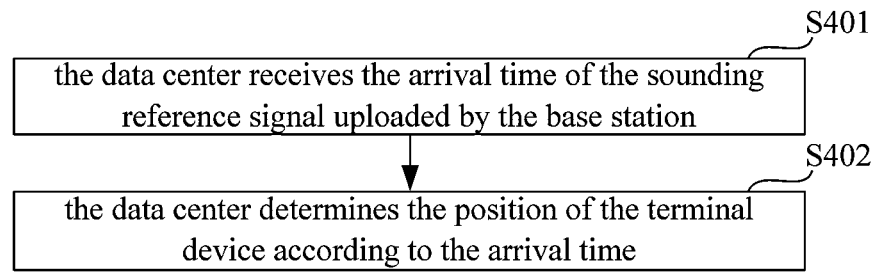
FIG. 4 is a flow chart of a positioning method applied to a data center according to an example of the present disclosure.

On the basis of the same inventive concept, examples of the present disclosure further provide a positioning method applied to the data center. Refer to FIG. 4 which is a flow chart of the positioning method applied to the data center, the positioning method may include:

In step S401, the data center receives the arrival time of the sounding reference signal uploaded by the base station, where the sounding reference signal is sent by the terminal device on the resources of the sounding reference signal distributed by the base station.

In step S402, the data center determines the position of the terminal device according to the arrival time.

In some examples of the present disclosure, related data of each terminal device may be gathered to the data center through the base station, wherein the related data may include the UE ID and the temporary terminal identifier and other information, the currently used resources of the sounding reference signal, the arrival time of the sounding reference signal arriving at the RRU, the current working state, etc. According to the arrival time, the data center may calculate and generate position information of the terminal device and maintain the position information in the map. The specific method of calculating the position information of the terminal device according to the arrival time is the same as the method used by the positioning function in the existing mobile communication system, which will not be repeated in the examples.

In these examples, as the data center further stores the position information of all RRUs connected to each base station, the moving track of each terminal device may be determined according to the position information of the terminal device. In addition, the data center may further generate, through processing and combining the cloud map data (including a multi-story building map, the accurate position information of RRU, etc.), useful data including a current accurate position, historical tracks, a moving speed, etc., of each terminal device and provide the useful data to a data user.

In some examples of the present disclosure, the data center may identify an event that the terminal device moves into the coverage area of a new base station. Specifically, the data center determines the target base station according to the position and the moving track of the terminal device and enables the target base station to send the system information broadcast to the terminal device. Here, the system information broadcast is used for enabling the terminal device to acquire the base station ID of the target base station and the resources of the sounding reference signal distributed by the target base station.

In some examples, the data center is further provided with a terminal abnormality processing method which specifically includes: in response to determining a working state of the terminal device is abnormal, the data center enables the base station to send the system information broadcast to the terminal device, where the system information broadcast is used for enabling the terminal device to carry out a random-access once again.

In specific implementations, the data center can monitor the terminal device according to related data uploaded by the base station and the terminal device. When determining that abnormal states including temporary terminal identifier conflict, resources conflict, etc. exist between different terminal devices, the data center may control the base station to send the system information broadcast to the terminal devices in an abnormal state, so that the terminal devices can carry out random-access once again. The terminal device may be controlled to stop sending the sounding reference signal and carry out random-access once again through setting the values of some specific fields of MIB in the system information broadcast. Specifically, a choice bit in MIB may be used. As an example, the default value of choice bit is set to 0, which indicates that the current information is MIB. When the value of choice bit is set to 1 (generally, the functional standard is not defined when choice bit has a non-default value, which is used in the examples to indicate that the terminal device is abnormal), it means that the terminal device in the coverage area of the current base station is abnormal, sounding reference signal sending should be stopped, and a random-access process needs to be carried out once again.

It can be seen from the above examples that the specific positioning flow of the positioning methods disclosed are simpler than that of a common mobile communication system (LTE, NR, etc.). The characteristics of these methods are that the terminal device does not need to enter the connecting state in the mobile communication system and also does not need to carry out measurement, cell reselection and other operations under the IDLE state. Through the flow of intra-channel selectivity (ICS) only, the terminal device can obtain network synchronization, carry out a random-access to obtain resources of the sounding reference signal, then periodically receive single cell broadcast and MIB, and send the sounding reference signal. The terminal device only needs to inform the base station of the position through the sounding reference signal sent by a few milliseconds, a few seconds, or a longer period. That is, a higher-precision positioning can be provided according to lower real-time requirements. Therefore, the solution of the present disclosure has the following characteristics: (1) a large quantity of terminal devices may be deployed within certain range; (2) the cost of the terminal device is extremely low, so that the terminal device may be abandoned at any time; (3) the terminal device may start to work at any time and does not need to pay a common mobile communication system for registration; (4) the terminal device is very suitable for carrying in view of volume and weight and may be conveniently attached to a small article; (5) the power consumption of the terminal device is extremely low, so that the terminal device may continuously work for a few days, a few weeks, and even longer with a disposable power supply or a renewable power supply; and (6) the terminal device may work under an environment covered by a mobile communication base station without re-deploying the entire positioning system.

It is to be noted that some examples of the present disclosure are described above. Other examples are also within the coverage of the disclosure. In some cases, the actions or steps recorded may be carried out in different sequence, and expected results still may be achieved. In addition, expected results still can be achieved when the procedures described in the drawings are carried out without being in accordance with the specific sequence or a continuous sequence. In some examples, multitasking and parallel processing may be permissible or is probably advantageous.

On the basis of the same inventive concept, the present disclosure further provides a positioning device corresponding to the positioning method applied to the terminal device.

Figure 5:
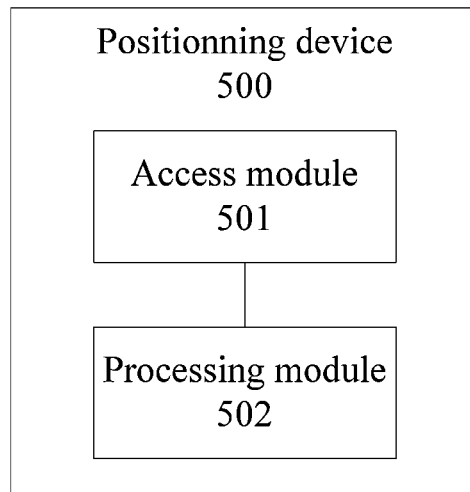
FIG. 5 is a schematic diagram illustrating a structure of a positioning device according to an example of the present disclosure.

As shown in FIG. 5, the positioning device 500 may include the following modules.

An access module 501 is configured to access the base station through a random-access process.

A processing module 502 is configured to obtain resources of a sounding reference signal distributed by a base station, and use the resources to send a sounding reference signal to the base station according to a predetermined first period, so as to enable the base station to determine an arrival time of the sounding reference signal and to determine a position of terminal device according to the arrival time.

In some examples, the access module 501 is configured to send a random-access request including a unique terminal identifier to the base station to enable the base station to generate a temporary terminal identifier corresponding to the unique terminal identifier and to bind the determined resources of the sounding reference signal to the temporary terminal identifier.

In some examples, the access module 501 is further configured to receive a check sequence sent by the base station, generate a local check sequence according to a predetermined algorithm, and complete the random-access process in response to determining the check sequence and the local check sequence are identical.

In some examples, the processing module 502 is further configured to receive a synchronization signal block sent by the base station according to a predetermined second period.

In some examples, the first period is matched with the second period, so that the terminal device may send the sounding reference signal after receiving the synchronization signal block.

In some examples, the processing module 502 is further configured to obtain and store the base station identifier and the system frame number of the base station according to the synchronization signal block.

In some examples, the processing module 502 is further configured to in response to determining that the base station identifier in the synchronization signal block received is different from the base station identifier stored by the terminal device, access, through the random-access process, a target base station corresponding to the base station identifier in the synchronization signal block received; or receive a system information broadcast sent by the target base station, and obtain, according to the system information broadcast, the base station identifier of the target base station and references of a sounding reference signal distributed by the target base station.

In some examples, the processing module 502 is further configured to in response to determining that a spare bit of a main information block of the system information broadcast is set to be a predetermined value, receive SIB8 of the system information broadcast to obtain the base station identifier of the target base station and the resources of the sounding reference signal distributed by the target base station.

For convenience, the above device is divided into various modules according to the functions of the device. Certainly, in actual implementations, the functions of each module may be achieved in one or more software and/or hardware.

The positioning device described above is used for implementing the positioning method applied to the terminal device in any of the above examples and has the beneficial effects of the corresponding methods. Therefore, the beneficial effects will not be repeated herein.

On the basis of the same inventive concept, the present disclosure further provides a positioning device corresponding to the positioning method applied to the base station.

Figure 6:
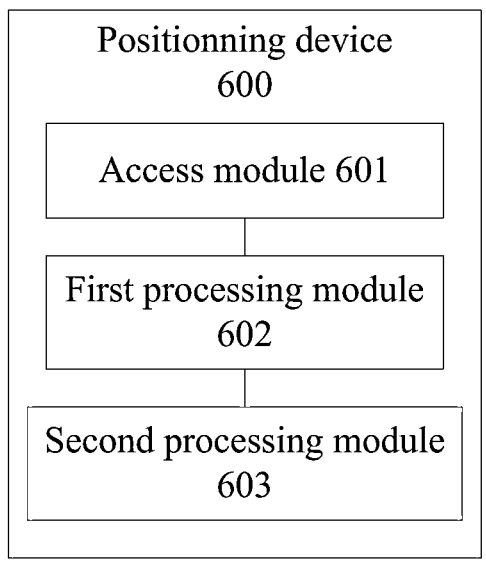
FIG. 6 is a schematic diagram illustration a structure of a positioning device according to another example of the present disclosure.

As shown in FIG. 6, the positioning device 600 may include the following modules.

An access module 601 is configured to access a terminal device accessed through a random-access process.

A first processing module 602 is configured to distribute resources of a sounding reference signal to the terminal device and receive a sounding reference signal sent by the terminal device according to a predetermined first period.

A second processing module 603 is configured to determine an arrival time of the sounding reference signal, and send the arrival time to a data center to enable the data center to determine a position of the terminal device according to the arrival time.

In some examples, the access module 601 is specifically configured to receive a random-access request sent by the terminal device, obtain a unique terminal identifier included in the random-access request, generate a temporary terminal identifier corresponding to the unique terminal identifier, determine the resources of the sounding reference signal and bind the resources of the sounding reference signal to the temporary terminal identifier.

In some examples, the access module 601 is further configured to generate a check sequence according to a predetermined algorithm and send the check sequence to the terminal device.

In some examples, the first processing module 602 is specifically configured to send a synchronization signal block according to the predetermined second period through a plurality of remote radio units.

In some examples, the second processing module 603 is specifically configured to receive, through at least three remote radio units respectively, the sounding reference signal sent by the terminal device, determine the arrival time respectively, and send the arrival time determined by the three remote radio units to the data center.

For convenience, the above device is divided into various modules according to the functions of the device. Certainly, in actual implementations, the functions of each module may be achieved in one or more software and/or hardware.

The positioning device described above is used for implementing the positioning method applied to the base station in any of the above examples and has the beneficial effects of the corresponding methods. Therefore, the beneficial effects will not be repeated herein.

On the basis of the same inventive concept, the present disclosure further provides a positioning apparatus corresponding to the positioning method applied to the data center.

Figure 7:
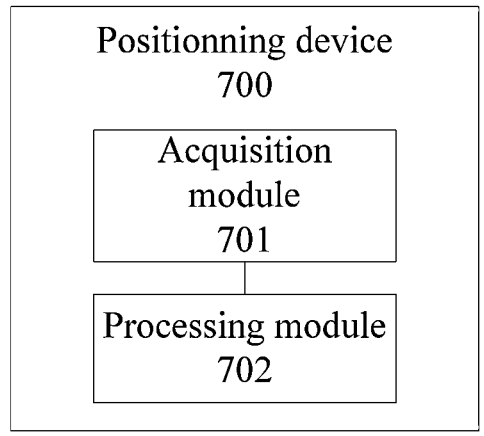
FIG. 7 is a schematic diagram illustration a structure of a positioning device according to still another example of the present disclosure.

As shown in FIG. 7, the positioning apparatus 700 may include the following modules.

An acquisition module 701 is configured to obtain arrival time of a sounding reference signal uploaded by a base station, wherein the sounding reference signal is sent by the terminal device on resources of the sounding reference signal distributed by the base station.

A processing module 702 is configured to determine a position of the terminal device according to the arrival time.

For convenience, the above device is divided into various modules according to the functions of the device. Certainly, in actual implementations, the functions of each module may be achieved in one or more software and/or hardware.

The positioning device described above is used for implementing the positioning method applied to the base station in any of the above examples and has the beneficial effects of the corresponding methods. Therefore, the beneficial effects will not be repeated herein.

Based on the same concept, one or more examples of the present disclosure also provide an electronic device. The electronic device may include a memory, a processor, and a computer program stored in the memory and executable on the processor, wherein the processor executes the program to implement any positioning method described above.

Figure 8:
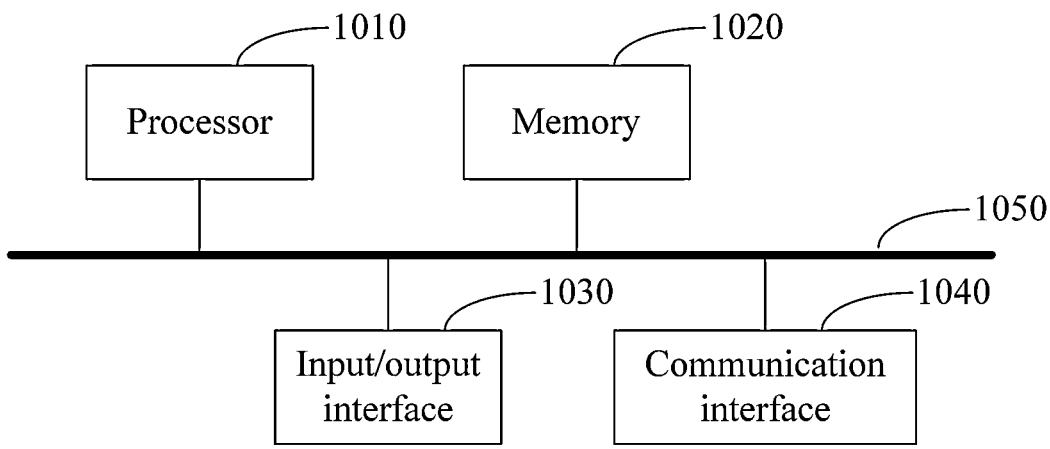
FIG. 8 is a schematic diagram illustration a structure of an electronic device according to an example of the present disclosure.

FIG. 8 is a schematic diagram illustrating the structure of the electronic device according to one or more examples of the present disclosure. Referring to FIG. 8, the electronic device may include a processor 1010, a memory 1020, an input/output interface 1030, a communication interface 1040 and a bus 1050. The processor 1010, the memory 1020, the input/output interface 1030 and the communication interface 1040 realize communication connections in the electronic device by means of the bus 1050.

The processor 1010 may be realized in the form of a general-purpose Central Processing Unit (CPU), a microprocessor, a Request Specific Integrated Circuit (ASIC), or one or more integrated circuits, etc. to perform relevant programs, thus realizing the technical solutions provided by the examples of the present disclosure.

The memory 1020 may be realized in the form of Read Only Memory (ROM), Random Access Memory (RAM), static storage device, dynamic storage device and the like. The memory 1020 may store an operating system and other application programs. When the technical solutions provided by the examples of the present disclosure is implemented by means of software or firmware, related program codes are stored in the memory 1020 and called and executed by the processor 1010.

The input/output interface 1030 is used to connect to an input/output module to realize information input and output. The input/output module may be arranged as a component in the equipment (not shown), or externally connected to the equipment to provide corresponding functions. The input equipment may comprise a keyboard, a mouse, a touch screen, a microphone and a plurality of sensors, and the output equipment may comprise a display, a speaker, a vibrator, and an indicator light.

The communication interface 1040 is used to connect to a communication module (not shown) to realize a communication interaction between the equipment and other equipment. The communication module may communicate by wired means (e.g., USB and network cable) or wireless means (e.g., mobile network, WIFI and Bluetooth).

The bus 1050 comprises a path transferring information among a plurality of components of the equipment, e.g., the processor 1010, the memory 1020, the input/output interface 1030 and the communication interface 1040.

It should be noted that although the equipment only shows the processor 1010, the memory 1020, the input/output interface 1030, the communication interface 1040 and the bus 1050, the equipment may further comprise other components necessary for normal operation in the specific implementation process. In addition, it should be understood by those of ordinary skill in the art that the equipment may only comprise components necessary for realizing the solution of the examples of the present disclosure, but not necessarily comprise all the components shown in the figures.

The electronic device described above is used for implementing the positioning method in any of the above examples and has the beneficial effects of the corresponding methods. Therefore, the beneficial effects will not be repeated herein.

Based on the same concept, one or more examples of the present disclosure also provide a non-transitory computer-readable storage medium, wherein the non-transitory computer-readable storage medium stores computer instructions, and the computer instructions are used to make a computer execute any of the positioning methods described above.

The computer readable medium of the examples includes volatile, non-volatile, movable, and non-movable media, which may realize information storage by means of any method or technology. The information may be computer readable instruction, data structure, program module or other data. The example of computer storage medium includes but not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read only memory (CD-ROM), digital versatile disc (DVD) or other optical memories, cassette magnetic tape, tape, magnetic disk storage or other magnetic memory devices or any other non-transmission media, which can store information accessible by the computing device.

The computer readable medium described above is used for implementing the positioning method in any of the above examples and has the beneficial effects of the corresponding methods. Therefore, the beneficial effects will not be repeated herein.

Those of ordinary skill in the art should understand that: any of the examples in discussion is exemplary only and not implicitly intended to limit the scope of the present disclosure (including the claims); based on the concept of the present disclosure, the technical features of the example or different examples can also be combined, the steps can be performed in any order, and there are many other changes in different aspects of one or more examples of the present disclosure, which are not provided in detail for brevity.

The disclosed embodiments are intended to cover all such alternatives, modifications and variations that fall within the broad scope of appended claims. Therefore, any omission, modification, equivalent replacement, improvement, etc. made within the spirit and principle of the embodiments of the present disclosure should be included within the protection scope of the present disclosure.

What is claimed is:

1. A positioning method, comprising:
sending, by a terminal device, a random-access request to a base station through a random-access process; wherein, the random-access request comprises a unique terminal identifier of the terminal device;
obtaining, by the terminal device, resources of a sounding reference signal distributed by the base station; wherein, the resources of the sounding reference signal distributed to the terminal device are bound with the unique terminal identifier of the terminal device; and
sending, by the terminal device, the sounding reference signal to the base station using the resources of the sounding reference signal according to a predetermined first period, enable the base station to determine the arrival time of the sounding reference signal and to determine the position of the terminal device according to the arrival time;
the method further comprising:
receiving, by the terminal device, a system information broadcast sent by a target base station; and
in response to determining that a spare bit of a main information block of the system information broadcast is set to be a predetermined value, receiving, by the terminal device, a system information block (SIB)8 of the system information broadcast to obtain a base station identifier of the target base station and the resources of the sounding reference signal distributed by the target base station;
wherein, the terminal device is only provided with a hardware module and a power module; wherein, the hardware module is used for communicating with the base station, carrying out the random-access process and sending the sounding reference signal; and the power module is used for supplying power to the hardware module.

2. The method of claim 1, wherein, after sending, by the terminal device, the random-access request to the base station, the method further comprising:
receiving, by the terminal device, a check sequence sent by the base station;
generating a local check sequence according to a predetermined algorithm; and
in response to determining the check sequence is consistent with the local check sequence, completing the random-access process.

3. The method of claim 1, wherein, before sending the sounding reference signal to the base station according to the predetermined first period, the method further comprising:
receiving, by the terminal device, a synchronization signal block sent by the base station according to a predetermined second period.

4. The method of claim 3, wherein the first period is matched with the second period to enable the terminal device to send the sounding reference signal after receiving the synchronization signal block.

5. The method of claim 3, wherein, receiving, by the terminal device, a synchronization signal block sent by the base station according to the predetermined second period comprises:
obtaining and storing, by the terminal device, a base station identifier of the base station and a system frame number according to the synchronization signal block.

6. The method of claim 5, wherein, receiving, by the terminal device, a synchronization signal block sent by the base station according to the predetermined second period comprises:
in response to determining that the base station identifier in the synchronization signal block received is different from the base station identifier stored, accessing, by the terminal device, the target base station corresponding to the base station identifier in the synchronization signal block received through a random-access process.

7. An electronic device, comprising a memory, a processor, and a computer program stored in the memory and executable on the processor, wherein the processor executes the program to implement the positioning method according to claim 1.

8. A non-transitory computer-readable storage medium, wherein the non-transitory computer-readable storage medium stores computer instructions, and the computer instructions are used to make a computer execute the positioning method according claim 1.

9. A positioning method, comprising:
receiving, by a base station, a random-access request sent by the terminal device;
obtaining, by the base station, a unique terminal identifier of the terminal device included in the random-access request;
determining, by the base station, resources of a sounding reference signal bounded with the unique terminal identifier of the terminal device;
distributing, by the base station, the resources of the sounding reference signal to the terminal device;
receiving, by the base station, the sounding reference signal sent according to a predetermined first period by the terminal device;
determining, by the base station, an arrival time of the sounding reference signal according to the sounding reference signal; and
sending, by the base station, the arrival time to a data center to enable the data center to determine a position of the terminal device according to the arrival time;
the method further comprising:
sending, by the base station, a system information broadcast to the terminal device to enable the terminal device in response to determining that a spare bit of a main information block of the system information broadcast is set to be a predetermined value, to receive a system information block (SIB)8 of the system information broadcast to obtain a base station identifier of the target base station and the resources of the sounding reference signal distributed by the target base station;
wherein, the terminal device is only provided with a hardware module and a power module; wherein, the hardware module is used for communicating with the base station, carrying out the random-access process and sending the sounding reference signal; and the power module is used for supplying power to the hardware module.

10. The method of claim 9, wherein determining, by the base station, resources of a sounding reference signal bounded with the unique terminal identifier of the terminal device comprises:

generating, by the base station, a temporary terminal identifier corresponding to the unique terminal identifier; and binding the resources of the sounding reference signal to the temporary terminal identifier.

11. The method of claim 9, wherein, after receiving, by the base station, the random-access request sent by the terminal device, the method further comprising:

generating, by the base station, a check sequence according to a predetermined algorithm; and sending the check sequence to the terminal device.

12. The method of claim 9, further comprising:

sending, by the base station, a synchronization signal block through a plurality of remote radio units according to a predetermined second period.

13. The method of claim 12, wherein determining, by the base station, an arrival time of the sounding reference signal and sending the arrival time to a data center comprises:

receiving, by the base station, the sounding reference signal sent by the terminal device through at least three remote radio units respectively;

determining, by the base station, the arrival time respectively, and sending, to the data center, the arrival time determined by the three remote radio units respectively.

14. A positioning method, comprising:

receiving, by a data center, an arrival time of a sounding reference signal uploaded by a base station; wherein the sounding reference signal is sent by a terminal device on resources of the sounding reference signal distributed by the base station; the resources of the sounding reference signal distributed to the terminal device are bound with a unique terminal identifier of the terminal device;

determining, by the data center, a position of the terminal device according to the arrival time;

the method further comprising:

determining, by the data center, a target base station according to the position of the terminal device and a moving track of the terminal device;

enabling, by the data center, the target base station to send a system information broadcast to the terminal device to enable the terminal device in response to determining that a spare bit of a main information block of the system information broadcast is set to be a predetermined value, to receive a system information block (SIB)8 of the system information broadcast to obtain a base station identifier of the target base station and the resources of the sounding reference signal distributed by the target base station;

wherein, the terminal device is only provided with a hardware module and a power module; wherein, the hardware module is used for communicating with the base station, carrying out the random-access process and sending the sounding reference signal; and the power module is used for supplying power to the hardware module.

15. The method of claim 14, further comprising:

obtaining and storing, by the data center, a unique terminal identifier of the terminal device, a temporary terminal identifier of the terminal device, the resources of the sounding reference signal distributed to the terminal device and positions of remote radio units of the base station uploaded by the base station; and determining, by the data center, the moving track and/or a working state of the terminal device according to data uploaded by the base station.

16. The method of claim 15, further comprising:

in response to determining the working state of the terminal device is abnormal, enabling, by the data center, the base station to send the system information broadcast to the terminal device, where the system information broadcast is used for enabling the terminal device to carry out a random-access once again.

* * * * *